United States Patent
O'Brien

(10) Patent No.: US 9,402,494 B1
(45) Date of Patent: Aug. 2, 2016

(54) CLOSET HANGER SPACING DEVICE AND SYSTEM

(71) Applicant: Marcie O'Brien, Livermore, CA (US)

(72) Inventor: Marcie O'Brien, Livermore, CA (US)

(73) Assignee: M&S Products, LLC, Reno, NV (US)

( * ) Notice: Subject to any disclaimer, the term of this patent is extended or adjusted under 35 U.S.C. 154(b) by 25 days.

(21) Appl. No.: 14/573,078

(22) Filed: Dec. 17, 2014

Related U.S. Application Data

(60) Provisional application No. 61/933,132, filed on Jan. 29, 2014.

(51) Int. Cl.
| | |
|---|---|
| A47G 25/06 | (2006.01) |
| A47F 7/12 | (2006.01) |
| A47F 7/24 | (2006.01) |
| A47B 61/00 | (2006.01) |
| F16B 2/20 | (2006.01) |
| F16L 3/02 | (2006.01) |
| F16L 3/12 | (2006.01) |
| F16L 3/10 | (2006.01) |
| F16L 11/10 | (2006.01) |
| F16L 11/115 | (2006.01) |
| B60R 7/10 | (2006.01) |
| A47F 7/19 | (2006.01) |

(52) U.S. Cl.
CPC .......... *A47G 25/0692* (2013.01); *A47B 61/003* (2013.01); *A47F 7/12* (2013.01); *A47F 7/19* (2013.01); *A47F 7/24* (2013.01); *B60R 7/10* (2013.01); *F16B 2/20* (2013.01); *F16L 3/02* (2013.01); *F16L 3/1033* (2013.01); *F16L 3/1226* (2013.01); *F16L 11/10* (2013.01); *F16L 11/115* (2013.01)

(58) Field of Classification Search
CPC ......... A47G 25/0692; A47F 7/12; A47F 7/24; A47F 7/19; A47B 61/003; F16B 2/20; F16L 3/02; F16L 3/1226; F16L 3/1033; F16L 11/10; F16L 11/115; B60R 7/10
USPC ................................ 211/123, 105.1; 206/291
See application file for complete search history.

(56) References Cited

U.S. PATENT DOCUMENTS

| | | | | |
|---|---|---|---|---|
| 1,813,556 | A * | 7/1931 | Young | 211/105.1 |
| 2,846,079 | A * | 8/1958 | Leeper | 211/123 |
| 2,881,804 | A * | 4/1959 | Bub et al. | 138/110 |
| 2,895,618 | A * | 7/1959 | Nathan | 211/123 |

(Continued)

FOREIGN PATENT DOCUMENTS

| | | | | |
|---|---|---|---|---|
| CH | 548187 | A * | 4/1974 | A47F 7/19 |
| DE | 3333295 | A1 * | 4/1985 | A47F 7/19 |

(Continued)

*Primary Examiner* — Eret McNichols
(74) *Attorney, Agent, or Firm* — Mark Lauer; Silicon Edge Law Group LLP

(57) ABSTRACT

A device for organizing clothes in a closet having a clothes hanger rod is disclosed. In one aspect, the device includes a series of resilient ribs that are each shaped as an incomplete circle that terminates at a first end and a second end, wherein the ribs are aligned along an axis that intersects a center of each circle, each of the ribs has a space between it and an adjacent one of the ribs, each of the first ends is connected to an adjacent one of the first ends, and each of the second ends is connected to an adjacent one of the second ends, and the ribs are adapted to fit onto the rod, with the space between the ribs configured to allow a clothes hanger hook to hang directly on the rod.

17 Claims, 3 Drawing Sheets

(56) References Cited

U.S. PATENT DOCUMENTS

| | | | | |
|---|---|---|---|---|
| 2,920,766 | A | * | 1/1960 | Geryoldine .................. 211/123 |
| 2,929,514 | A | * | 3/1960 | Stewart ........................ 211/123 |
| 2,945,595 | A | * | 7/1960 | Gardner, Jr. ............. B60R 7/10 211/105.3 |
| 2,969,881 | A | * | 1/1961 | Lilly ........................ B60R 7/10 211/105.3 |
| 2,993,602 | A | * | 7/1961 | Zeman et al. ................ 211/123 |
| 3,002,666 | A | * | 10/1961 | Silverman ................ B60R 7/10 211/123 |
| 3,254,774 | A | * | 6/1966 | Schild .......................... 211/182 |
| 3,455,336 | A | * | 7/1969 | Ellis ............................. 138/156 |
| 3,576,304 | A | * | 4/1971 | Gillemot et al. ............ 248/74.2 |
| 3,984,002 | A | * | 10/1976 | Howard ......................... 211/45 |
| 4,283,239 | A | * | 8/1981 | Corke et al. ................... 156/85 |
| 4,361,241 | A | * | 11/1982 | Stoddard ...................... 211/123 |
| 4,498,938 | A | * | 2/1985 | Moisson et al. ............... 156/49 |
| 4,548,328 | A | * | 10/1985 | Brauning ...................... 211/205 |
| D282,903 | S | * | 3/1986 | Baker .......................... D8/356 |
| 4,629,065 | A | * | 12/1986 | Braaten ...................... 206/315.1 |
| 4,713,272 | A | * | 12/1987 | Bachel et al. ................ 428/34.9 |
| 4,729,482 | A | * | 3/1988 | Nicholson ................. 211/105.2 |
| 4,761,194 | A | * | 8/1988 | Pithouse et al. ............... 156/86 |
| 4,860,799 | A | * | 8/1989 | Van Noten ................... 138/167 |
| 4,900,596 | A | * | 2/1990 | Peacock ...................... 428/34.5 |
| 4,960,213 | A | * | 10/1990 | Pfeifer ......................... 211/123 |
| 5,018,627 | A | * | 5/1991 | Moore .......................... 211/123 |
| D337,493 | S | * | 7/1993 | King .............................. D8/380 |
| 5,300,732 | A | * | 4/1994 | Wambeke et al. .............. 174/92 |
| 5,647,492 | A | * | 7/1997 | Fillios et al. ................. 211/123 |
| 6,167,914 | B1 | * | 1/2001 | Koteskey ...................... 138/110 |
| D438,450 | S | * | 3/2001 | Jones ............................ D8/376 |
| D439,564 | S | * | 3/2001 | Huang ......................... D13/153 |
| 8,613,411 | B1 | * | 12/2013 | Mohns et al. ................ 248/74.3 |
| 8,998,044 | B1 | * | 4/2015 | Perrin ............................. 223/85 |
| 9,052,042 | B2 | * | 6/2015 | May |
| 2011/0186696 | A1 | * | 8/2011 | Hsieh et al. .................. 248/74.2 |
| 2012/0198680 | A1 | * | 8/2012 | Durben et al. ................. 29/428 |
| 2014/0352834 | A1 | * | 12/2014 | McLellan ..................... 138/172 |
| 2015/0005869 | A1 | * | 1/2015 | Soletti et al. ................ 623/1.13 |

FOREIGN PATENT DOCUMENTS

| | | | | |
|---|---|---|---|---|
| DE | 3444932 | A1 | * | 6/1986 | ............ A47F 7/19 |
| DE | 3832399 | A1 | * | 5/1989 | ............ E03C 1/02 |
| DE | 3925171 | A1 | * | 2/1991 | ............ F16L 3/02 |
| DE | 4032256 | A1 | * | 4/1992 | ............ B60S 1/46 |
| DE | 102005053391 | | * | 5/2007 | |
| GB | 831339 | A | * | 3/1960 | |
| GB | 2134334 | A | * | 8/1984 | |
| GB | 2499083 | A | * | 8/2013 | |
| GB | 2512580 | A | * | 10/2014 | |
| WO | WO 2004095666 | A1 | * | 11/2004 | ............ H02G 11/00 |

* cited by examiner

CLOSET HANGER SPACING DEVICE AND SYSTEM

CROSS-REFERENCE TO RELATED APPLICATION

This application claims the benefit under 35 U.S.C. §119 of Provisional Application No. 61/933,132, filed by the present inventor on Jan. 29, 2014, which is incorporated herein by reference.

BACKGROUND

The need to space clothes hangers that hang from closet rods has existed for many decades if not centuries.

U.S. Pat. No. 2,868,389 to Friend notes that it was well known over fifty years ago that conventional garment hangers, particularly the most usual type of wire hangers, have an annoying characteristic, in that adjacent hangers tend to become entangled with one another. As a result, when one attempts to remove a garment hanger from the clothes bar, it is found, on many occasions, that the hanger that is to be removed is entangled with adjacent hangers, the hangers being difficult to separate from one another and hence causing considerable inconvenience and annoyance. Friend solves this problem by providing a plurality of garment hanger support sleeves, slidably adjustable along the clothes bar and so designed as to uniformly space the several hangers along the length of the clothes bar, with the spacing being such that the hangers will not tangle with one another under ordinary circumstances. Unfortunately, Friends' solution does not lend itself to easily adding or removing the sleeves once the rod is attached in the closet.

U.S. Pat. No. 4,971,210 to Blumenkranz et al. solves the problem of requiring removal of the bar from the closet by providing a clamshell-type sleeve that can open and shut to attach to the closet bar. The mechanisms used by Blumenkranz to allow the sleeve to open and shut, however, instill extra complexity and cost to that invention.

U.S. Pat. No. 4,760,929 to Fedorchak also discloses a generally tubular or sleeve-like body which can have different spacing elements on it, ranging from wavelike indentations to notches, in which the hook portions of hangers may be located. Fedorchak acknowledges the problem of possible rotation of the sleeve, and provides a series of longitudinal ridges inside the sleeve to grip a closet bar or double sided tape to adhere to the bar. Such interior ridges, however, are effective only if the bar is of a size and shape that closely matches the sleeve. Moreover, double sided tape or other adhesive conflicts with the desire to have the bar removable and its position on the bar adjustable.

More recently, U.S. Patent Application Publication 2006/0278594 to Macon provides a similar closet hanger spacing device with notches for hanger hooks and adhesive elements such as double sided tape to prevent rotation.

To the best of applicant's knowledge, none of these prior art approaches is commercially available, suggesting a failure to fulfill the goal of providing a closet hanger spacing device that works well. Stated differently, an effective solution to the problem of closet hanger spacing has eluded inventors for decades.

SUMMARY

In one embodiment, a device for organizing clothes in a closet having a clothes hanger rod is disclosed, the device comprising: a series of resilient ribs that are each shaped as an incomplete circle that terminates at a first end and a second end; wherein the ribs are aligned along an axis that intersects a center of each circle; wherein the first ends are aligned along a first line and the second ends are aligned along a second line, and the first and second lines are parallel to the axis; wherein each of the ribs has a space between it and an adjacent one of the ribs; wherein each of the first ends is connected to an adjacent one of the first ends, and each of the second ends is connected to an adjacent one of the second ends; and wherein the ribs are adapted to fit onto the rod, with the space between the ribs configured to allow a clothes hanger hook to hang directly on the rod.

In one embodiment, a device for organizing clothes in a closet having a clothes hanger rod is disclosed, the device comprising: a first elongate bar; a second elongate bar that is parallel to the first elongate bar; and a series of resilient ribs that are each shaped as an incomplete circle that terminates at a first end and a second end; wherein each of the first ends are connected to the first bar and each of the second ends are connected to the second bar; wherein each of the ribs is separated from another of the ribs by a space that is adapted to hold a hanger hook; and wherein the ribs are adapted to fit onto the rod.

DETAILED DESCRIPTION

Figure 1:
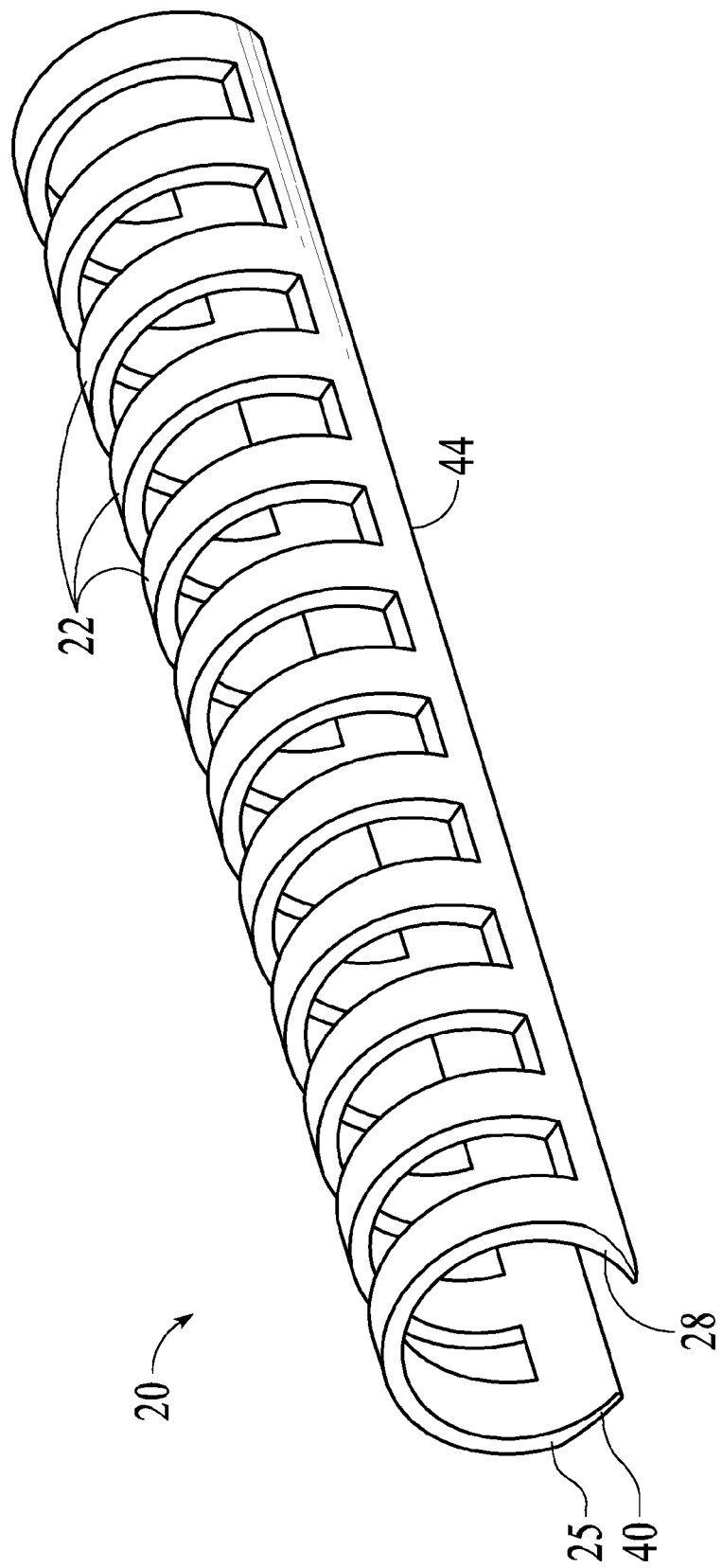
FIG. 1 is a perspective view of a device for organizing clothes hangers in a closet having a clothes hanger rod.
Figure 2:
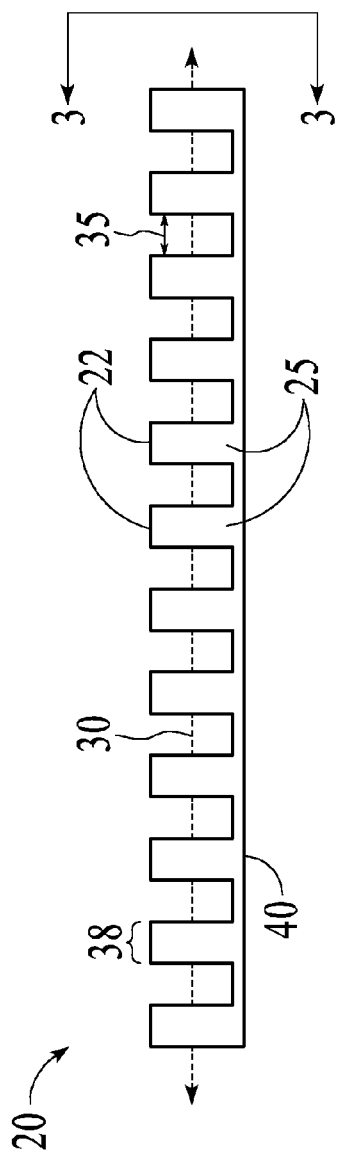
FIG. 2 is side view of the device of FIG. 1.
Figure 3:
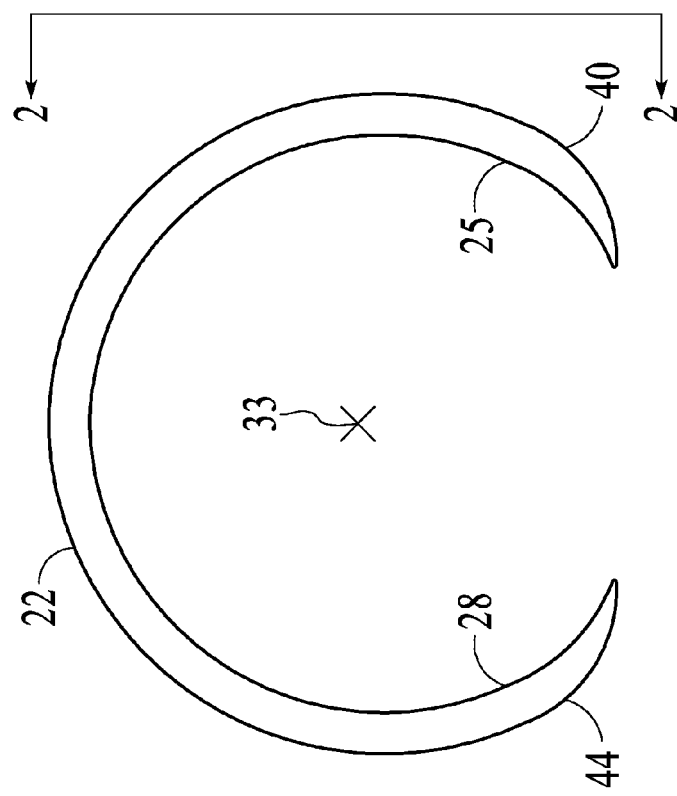
FIG. 3 is an end view of the device of FIG. 1.

FIG. 1 is a perspective view of one embodiment of a device 20 for organizing clothes in a closet having a number of clothes hanger rods. FIG. 2 is side view of the embodiment of FIG. 1, and FIG. 3 is an end view of that embodiment, with the views of FIG. 2 and FIG. 3 being perpendicular to each other and sized to facilitate illustration.

The device 20 has a series of resilient ribs 22 that are each shaped as an incomplete circle that terminates at a first end 25 and a second end 28. The ribs 22 are of a size that fits onto a standard-sized clothes hanging rod, not shown, that is conventionally used for hanging clothes in a closet. In one example, a clothes hanging rod has a diameter of about 1¼ or 1 5/16 inches (about 3.1 or 3.3 centimeters), and the ribs 22 have an inner diameter that is in a range between 3.1 cm and 4 cm. More generally, an inner diameter of each of the ribs is in a range between 3 centimeters and 5 centimeters. Each of the ribs extends radially outward from its inner diameter by at least 0.3 centimeter, and preferably less than 2 centimeters.

The ribs 22 are aligned along an axis 30 that intersects a center 33 of each circle. The first ends 25 are aligned along a first line and the second ends 28 are aligned along a second line, and the first and second lines are parallel to the axis 30. Each of the ribs has a space 35 between it and an adjacent one of the ribs, the space being of a size allow a clothes hanger hook to hang directly on the rod. In an example that may be preferred for plastic hanger hooks, the space is in a range between 0.5 centimeter and 3 centimeters. In an example that may be preferred for wire hanger hooks, the space is in a range between 0.4 centimeter and 1.5 centimeter. In one embodiment, the ribs have a width 38 measured in a direction parallel to the axis 30 that may be in a range between 1 centimeter and 4 centimeters. The width of the ribs and the space between the ribs can be outside the ranges listed.

Each of the first ends 25 is connected to an adjacent one of the first ends 25, and each of the second ends 28 is connected to an adjacent one of the second ends 28. Each of the first ends 25 may be connected to an adjacent one of the first ends 25 by a bridge or bar 40, and each of the second ends 28 may be connected to an adjacent one of the second ends 28 by a bridge or bar 44.

Figure 4:
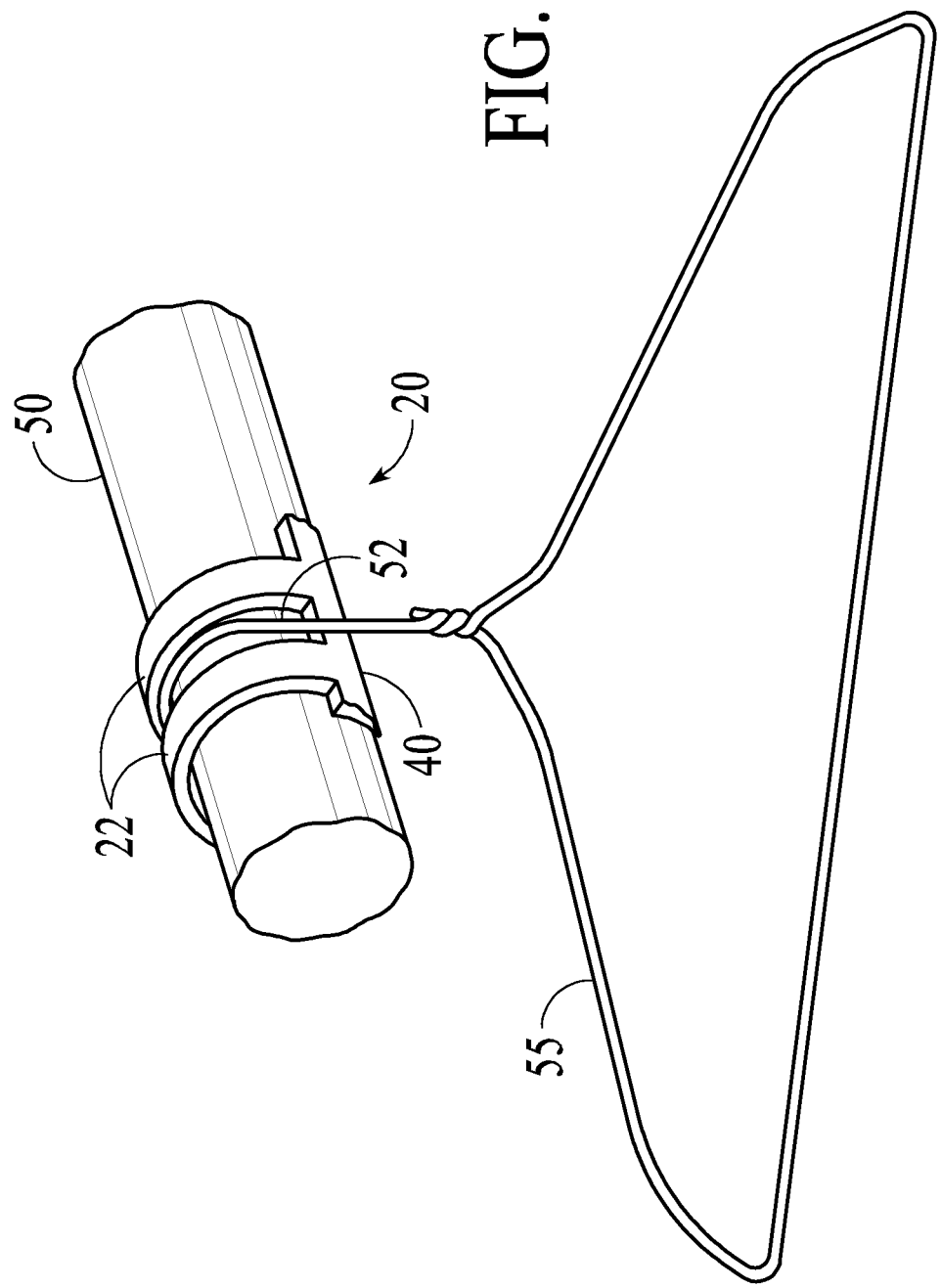
FIG. 4 is a cutaway perspective view of a portion of the device of FIG. 1 disposed on a clothes hanging rod, with a clothes hanger hanging directly on the rod between of the ribs.

FIG. 4 shows a cutaway perspective view of a portion of the device 20 with just two of the ribs 22 shown to facilitate illustration. The device is fitted onto a rod 50 with a hook 52 of a clothes hanger 55 fitting in the space between the ribs 22 to hang directly on the rod 50. Because the ribs 22 and the spaces between them extend circumferentially along with the hook 52, hangers are prevented from twisting, unlike some prior art devices.

The hook 52 prevents the device 20 from rotating on the rod 50, because the bars 40 and 44 are stopped by the hook 52 from rotating. Although the rod 50 in this example has a similar diameter as an inner diameter of the device 20, the hook 52 can similarly prevent the device 20 from rotating on a much thinner rod. Because the hanger 55 hangs directly on the rod 50 instead of at an elevated position, the hanger does not encourage rotation of the device 20, unlike prior art devices.

The device 20 is easily placed onto and removed from the rod 50 because no adhesive or other means of attachment is needed to keep the rod from rotating and falling off. Likewise, the device 20 can slide along the rod 50 to be placed at different positions along the rod and to be attached and removed from the rod. Other identical or similar devices, not shown, can be placed on the rod 50 abutting device 20. An end piece, not shown, can be removably attached to a first rib of the series of ribs 22, the end piece extending radially outward from the first rib to provide a prominent divider.

The foregoing description of exemplary embodiments of the invention has been presented for the purposes of illustration and description. It is not intended to be exhaustive or to limit the invention to the precise form disclosed. For example, although certain dimensions for a device for organizing clothes in a closet having a clothes hanger rod are discussed, other dimensions are contemplated. Many modifications and variations are possible in light of the above teaching. It is intended that the scope of the invention be limited not by this description, but rather by the following claims and any equivalents thereof.

The invention claimed is:

1. A device for organizing clothes in a closet, the device comprising:
a cylindrical clothes hanger rod;
a series of resilient ribs that are each shaped as an incomplete circle that terminates at a first end and a second end, the ribs having an inner diameter that is in a range between 3 centimeters and 5 centimeters;
wherein the ribs are aligned along an axis that intersects a center of each circle;
wherein the first ends are aligned along a first line and the second ends are aligned along a second line, and the first and second lines are parallel to the axis;
wherein each of the ribs has a space between it and an adjacent one of the ribs;
wherein each of the first ends is connected to an adjacent one of the first ends, and each of the second ends is connected to an adjacent one of the second ends; and
wherein the ribs are adapted to fit onto and around the cylindrical rod, with the space between the ribs configured to allow a clothes hanger hook to hang directly on the rod.

2. The device of claim 1, wherein a width of each of the ribs in a direction parallel to the axis is in a range between 1 centimeter and 3 centimeters.

3. The device of claim 1, wherein the space between adjacent ribs is in a range between 0.4 centimeter and 1.5 centimeter.

4. The device of claim 1, wherein the inner diameter is in a range between 3.1 centimeters and 4 centimeters.

5. The device of claim 1, wherein each of the ribs extends radially outward from its inner diameter by at least 0.3 centimeter.

6. The device of claim 1, wherein each of the ribs is configured to extend circumferentially at least halfway around the rod.

7. The device of claim 1, wherein the ribs are configured to hold a plurality of clothes hangers each having a semicircular hook, wherein each of the hooks fits into the space between adjacent ribs, such that the hangers are spaced apart from each other.

8. The device of claim 1, further comprising a second series of resilient, semicircular ribs that are adapted to fit onto the rod and abut the series of resilient ribs.

9. A device for organizing clothes in a closet, the device comprising:
a cylindrical clothes hanger rod;
a clothes hanger having a hook that hangs on the rod;
a first elongate bar;
a second elongate bar that is parallel to the first elongate bar; and
a series of resilient ribs that are each shaped as an incomplete circle that terminates at a first end and a second end, the ribs having an inner diameter that is in a range between 3 centimeters and 5 centimeters;
wherein each of the first ends are connected to the first bar and each of the second ends are connected to the second bar;
wherein each of the ribs is separated from another of the ribs by a space that is adapted to hold a hanger hook; and
wherein the ribs partly encircle the rod and the hanger hook is disposed between a first and second of the ribs.

10. The device of claim 9, wherein a width of each of the ribs in a direction parallel to the axis is in a range between 1 centimeter and 3 centimeters.

11. The device of claim 9, wherein the space is in a range between 0.4 centimeter and 1.5 centimeter.

12. The device of claim 9, wherein the ribs have an inner diameter that is in a range between 3.1 centimeters and 4 centimeters.

13. The device of claim 9, wherein each of the ribs extends radially outward from the inner diameter by at least 0.3 centimeter.

14. The device of claim 9, wherein each of the ribs is configured to extend at least halfway around the rod.

15. The device of claim 9, wherein the ribs are configured to hold a plurality of clothes hangers each having a semicircular hook, wherein each of the hooks fits into a space between adjacent ribs, such that the hangers are spaced apart from each other.

16. The device of claim 9, further comprising a set of resilient ribs that are each shaped as an incomplete circle that is adapted to fit onto the rod and abut the series of ribs.

17. A device for organizing clothes in a closet having a clothes hanger rod, the device comprising:

a cylindrical clothes hanger rod; and a series of resilient ribs that are each shaped as an incomplete circle that terminates at a first end and a second end;

wherein the ribs are aligned along an axis that intersects a center of each circle;

wherein each of the ribs has a space between it and an adjacent one of the ribs;

wherein each of the first ends is connected to a first bar, and each of the second ends is connected to a second bar; and wherein the ribs fit onto and around the cylindrical rod, with and the space between the ribs allows a clothes hanger hook to hang directly on the rod.

\* \* \* \* \*